United States Patent [19]

Browne

[11] Patent Number: 4,886,295
[45] Date of Patent: Dec. 12, 1989

[54] VEHICLE OCCUPANT PROTECTION SYSTEM

[75] Inventor: Alan L. Browne, Grosse Pointe, Mich.

[73] Assignee: General Motors Corporation, Detroit, Mich.

[21] Appl. No.: 279,733

[22] Filed: Dec. 5, 1988

[51] Int. Cl.$^4$ .............................................. B62D 1/18
[52] U.S. Cl. ..................................... 280/777; 180/78; 74/492; 188/371
[58] Field of Search .......................... 280/777; 180/78; 188/371; 74/492

[56] References Cited

U.S. PATENT DOCUMENTS

| | | | |
|---|---|---|---|
| 3,392,599 | 7/1968 | White | 74/492 |
| 3,476,345 | 11/1969 | Ristau | 74/492 |
| 3,538,783 | 11/1970 | Butts | 29/149.5 |
| 3,788,148 | 1/1974 | Connell et al. | 74/492 |
| 3,801,123 | 4/1974 | Jira | 280/777 |
| 3,992,046 | 11/1976 | Braess | 296/65 |
| 4,337,967 | 7/1982 | Yoshida et al. | 280/777 |
| 4,381,829 | 5/1983 | Montaron | 180/274 |
| 4,399,887 | 8/1983 | Okada | 180/282 |
| 4,445,708 | 5/1984 | Oakes et al. | 280/777 |
| 4,474,257 | 10/1984 | Lee | 180/271 |
| 4,531,619 | 7/1985 | Eckels | 280/777 |
| 4,643,448 | 2/1987 | Loren | 280/777 |

FOREIGN PATENT DOCUMENTS 2408174 9/1974 Fed. Rep. of Germany ...... 280/777

Primary Examiner—Kenneth R. Rice
Attorney, Agent, or Firm—Saul Schwartz

[57] ABSTRACT

An actively variable protection system for an occupant of a vehicle including a collapsible steering column having an upper mast jacket and a lower mast jacket, an energy absorber between the upper and lower mast jackets having a plurality of roll deformers between the lower mast jacket and split sleeve in a housing connected to the upper mast jacket, an expandable bag in the housing surrounding the split sleeve, and a control system for controlling the pressure in the bag. The control system includes sensors and a microprocessor for determining the kinetic energy of an occupant and a controller for adjusting the pressure in the bag to squeeze the split sleeve around the roll deformers such that the capacity of the energy absorber through the maximum stroke of the collapsible steering column equals the computed kinetic energy of the occupant.

4 Claims, 2 Drawing Sheets

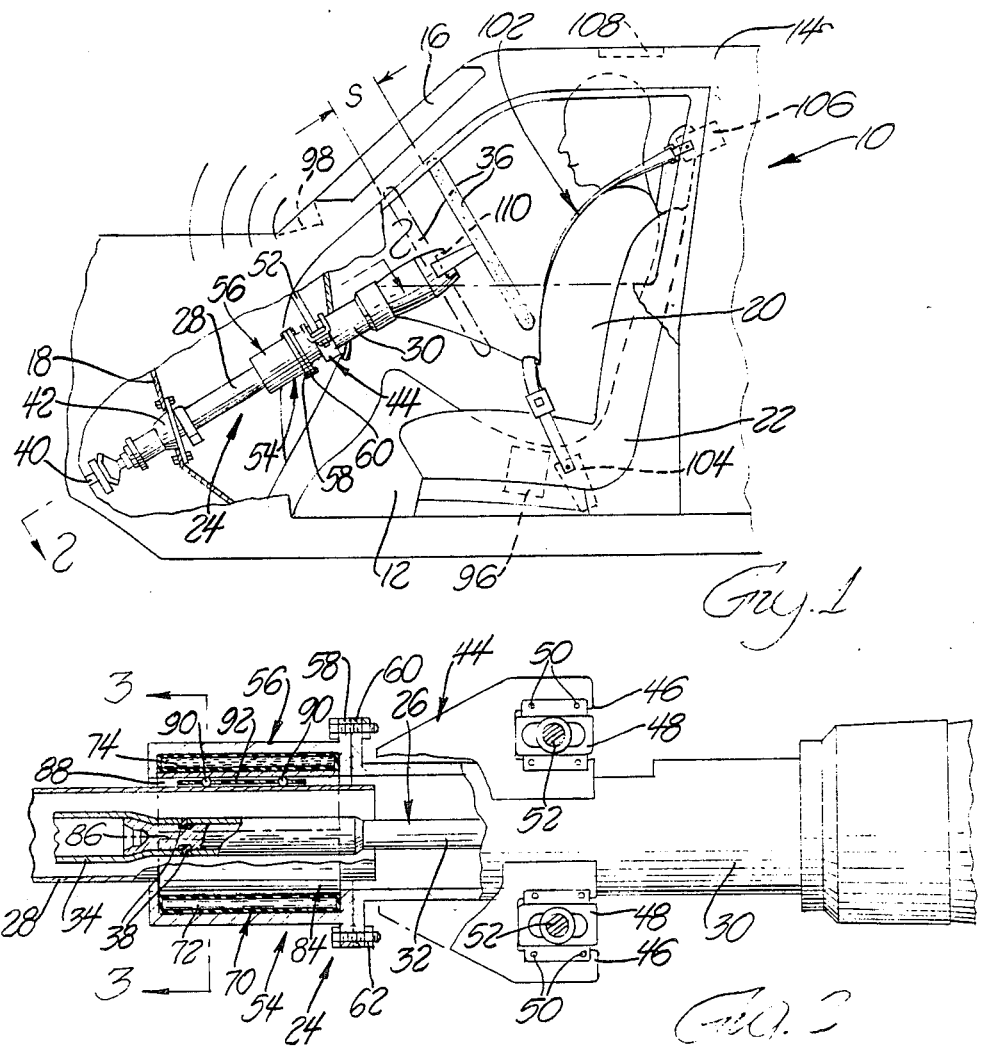
Fig. 1
Fig. 3
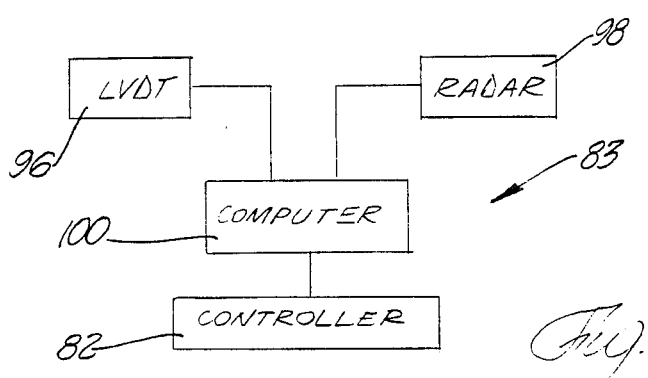
Fig. 5

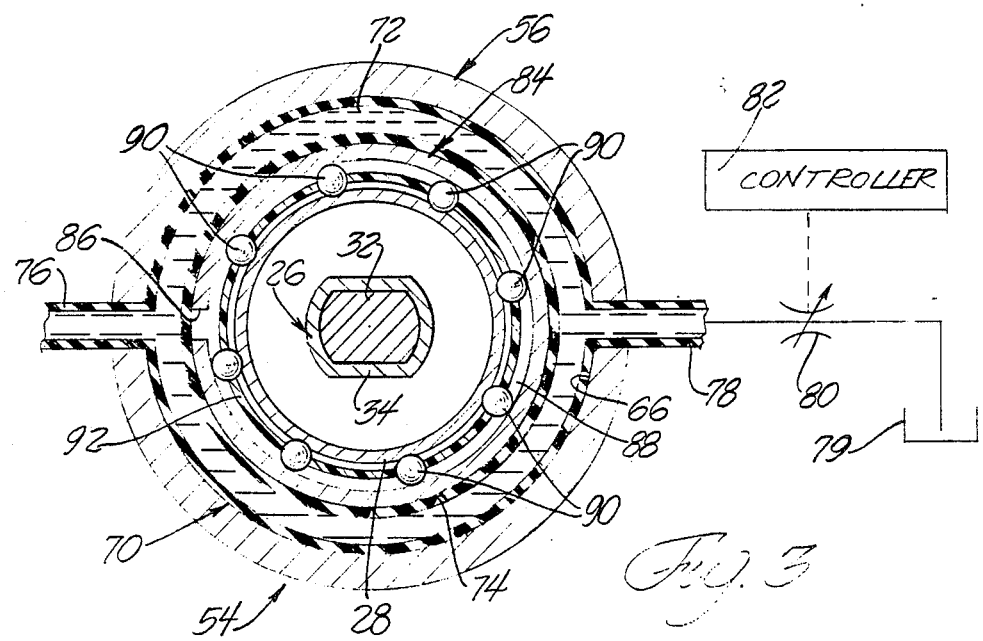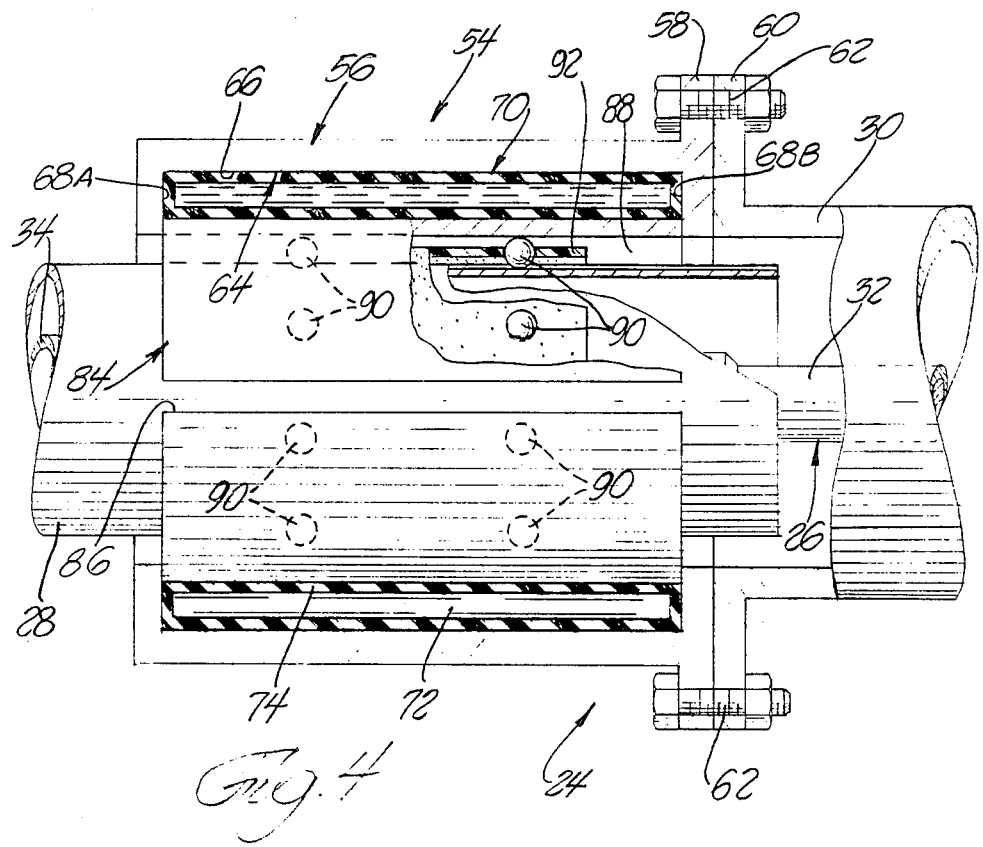

VEHICLE OCCUPANT PROTECTION SYSTEM

FIELD OF THE INVENTION

This invention relates to energy absorbing type occupant protection systems in automobiles.

BACKGROUND OF THE INVENTION

Energy absorbing type occupant protection systems in automobiles, such as the collapsible steering column described in U.S. Pat. No. 3,392,599, issued July 16, 1968 to R. L. White and assigned to the assignee of this invention, absorb or dissipate energy by stroking a first member relative to a second member against a resisting force developed between the two members. With respect to minimizing the reaction force experienced by an occupant initiating an energy absorbing stroke between the two members, optimal performance is achieved when the kinetic energy of the occupant just matches the energy absorbing capacity of the system, i.e the kinetic energy of the occupant is fully expended just a completion at the maximum stroke between the members. In typical energy absorbing occupant protection systems where the energy absorbing capacity is fixed at the time the system is assembled, optimal performance is difficultl to achieve because the amount of energy the system must absorb depends on variables such as the mass of the occupant. In an occupant protection system according to this invention, the energy absorbing capacity of the system is actively adjusted in accordance with a least one operational variable so that the performance of the system in an actual energy absorbing event is more likely to aapproach optimal performance.

SUMMARY OF THE INVENTION

This invention is a new and improved energy absorbing occupant protection system for automobiles wherein a reaction force experienced by an occupant of the vehicle during energy absorption is minimized by actively adjusting the energy absorbing capacity of the system in advance to correspond more closely to the actual kinetic energy of the occupant. A preferred, collapsible steering column realization of the occupant protection system according to this invention includes an adjustable energy absorber between telescopically related mast jackets of the steering column and a control system operative to adjust the collapse resisting potential of the energy absorber in accordance with variables representative of the actual kinetic energy the driver. In the preferred realization, the energy absorber includes a plurality of cold working balls disposed with an interference fit between a cylindrical wall of one of the telescopically related mast jackets of the steering column and an adjustable cylindrical wall attached to the other of the telescopically related mast jackets of the steering column, the adjustable wall changing the interference fit of the cold working balls and thereby the energy absorbing capacity of the collapsible steering column. In the preferred realization, the adjustment of the interference fit is effected by an annular expandable pressure chamber around the adjustable wall which chamber is part of a flow path from a pump to a reservoir in which flow path is also located an orifice having an actively adjustable flow area. The flow area of the orifice is adjusted as a function of the kinetic energy of the driver to change the pressure in the expandablel chamber and thereby the interference fit to which the energy absorbing balls are subjected.

BRIEF DESCRIPTION OF THE DRAWINGS

FIG. 1 is a partially broken away elevational view of the passenger compartment of an automobile having an occupant protection system according to this invention;

FIG. 2 is an enlarged, partially broken away view taken generally along the plane indicated by lines 2—2 in FIG. 1;

FIG. 3 is a sectional view taken generally along the plane indicated by lines 3—3 in FIG. 2;

FIG. 4 is an enlarged, partially broken away view of a portion of FIG. 2; and

FIG. 5 is a schematic control diagram for the occupant protection system according to this invention.

DESCRIPTION OF THE PREFERRED EMBODIMENT

Referring to FIG. 1, an automobile body 10 has a passenger compartment 12 bounded at the top by a roof 14 of the body and at the front by a windshield 16 and a panel structure 18 below the windshield. An occupant 20 of the vehicle, for example the driver, is seated on a seat 22 in the passenger compartment behind an occupant protection system according to this invention in the form of a collapsible steering column 24.

As seen best in FIGS. 1 and 2, the steering column 24 includes a steering shaft assembly 26, a tubular lower mast jacket 28 of preferably low carbon steel, and a tubular upper mast jacket 30 larger in diameter than the lower mast jacket. The steering shaft assembly 26 includes an upper shaft 32, a lower shaft 34, and a steering wheel 36 connected to the upper end of the upper shaft 32 for unitary rotation. The lower end of the upper shaft has a non-circular cross section, FIG. 3, and is telescopically received in a correspondingly shaped tubular upper end of the lower shaft 34 whereby the upper and lower shafts are rotatable as a unit and longitudinally collapsible. A plurality of insitu molded plastic shear pins 38, FIG. 2, maintain the relative longitudinal positions of the upper and lower shafts until the column collapses. The lower end of the lower shaft 34 is connected to a steering gear 40 of the vehicle. The steering shaft assembly 26 transfers steering input at the steering wheel 36 to the steering gear 40 in conventional fashion.

The tubular lower mast jacket 28 surrounds and rotatably supports the lower portion of the steering shaft assembly 26 and is anchored at its lower end to the panel structure 18 by a bracket 42 so that the lower mast jacket is stationary in its longitudinal direction relative to the panel structure. The tubular upper mast jacket 30 surrounds and rotatably supports the upper portion of the steering shaft assembly 26. The upper mast jacket has a rigid bracket 44 thereon, FIG. 2, which includes a pair of slots 46 open toward the steering wheel 36. Each slot 46 has a capsule 48 therein retained by a plurality of insitu injection molded plastic shear pins 50. Respective ones of a pair of hanger bolts 52 of the vehicle body extend through corresponding ones of the capsules 48 and carry nuts, not shown, at their distal endds whereby the upper part of the steering column assembly in releasably attached to the vehicle body. At an impact on the steering wheel 36, the upper mast jacket 30 collapses relative to the lower mast jacket through a maximum stroke S, FIG. 1, determined primarily by physical constraints of the passenger compartment 12.

As seen best in FIGS. 2-4, relative collapse between the upper and lower mast jackets is resisted by an energy absorber 54 therebetween. The energy absorber 54 includes a cylindrical housing 56 around the upper portion of the lower mast jacket 28. The housing 56 has a radial flange 58 at one end which abuts a similar radial flange 60 at the lower end of the upper mast jacket 30. An array of bolts 62 through holes in the flanages 58 and 60 rigidly attaches the housing 56 to the upper mast jacket 30. The inside diameter of the housing 56 is generally equal to the inside diameter of the upper mast jacket 30. Internally, the housing 56 includes an inward opening annular chamber 64, FIG. 4, bounded radially by an inside wall 66 of the housing and axially by a pair of annular end walls 68A-B of the housing.

An annular flexible or expandable bag 70 is disposed in the annular chamber 64. The bag is preferably constructed of a suitable elastomeric material and includes an internal fluid chamber 72 bounded on a radially inner side by a cylindrical inside wall 74 of the bag 70. As seen best in FIG. 3, the bag 70 has an inlet pipe 76 and an outlet pipe 78 each open to the fluid chamber 72 of the bag and extending through the housing 56. The inlet pipe is connected to a pump, not shown, driven in any conventional manner when the vehicle is in operation. The outlet pipe 78 discharges into a reservoir 79 for the pump and has a variable orifice 80, FIG. 3, therein of any conventional design. The instantaneous flow area of the orifice 80 is under the control of a controller 82 of a schematically illustrated control system 83, FIG. 5, of the occupant protection system according to this invention.

The pump circulates fluid through the fluid chamber 72 of the bag 70. When the variable orifice 80 is fully open, pressure in the fluid chamber 72 is low and the bag assumes a normal or unstretched shape, FIGS. 3-4. As the orifice 80 closes and the flow area thereof decreases, pressure in the fluid chamber 72 increases. Because the bag is captured on three sides by the inside wall 66 and the annular end walls 68A-B of the housing 56, the pressure increase in the fluid chamber 72 is accompanied by a decrease in the diameter of the inside wall 74 of the bag.

A split cylindrical sleeve 84, preferably of the same low carbon steel as the lower mast jacket 28, is disposed in the annular chamber 64 of the housing 56 radially inboard of the bag 70 and against the inside wall 74 of the bag. The opposite longitudinal ends of the sleeve abut the corresponding end walls 68A-B of the housing so that the sleeve is longitudinally stationary relative to the housing 56 and the upper mast jacket 30. The sleeve 84 is split lengthwise at a gap 86 and cooperates with the outside of the lower mast jacket 28 in defining an annulus 88 therebeween, FIGS. 3 and 4. When the fluid chamber 72 of the bag 70 is pressurized, the inside wall 74 of the bag squeezes the sleeve 84 whereby the circumferential extent of the gap 86, the inside diameter of the sleeve, and the radial depth of the annulus 88 all decrease.

The energy absorber 54 further includes a plurality of cold working roll deformers in the form of steel balls 90 disposed in the annulus 88. The balls 90 are held in a tubular plastic separator 92 between the lower mast jacket 28 and the sleeve 84 such that the separation between the balls is maintained while the balls are still free to roll relative to the lower mast jacket and to the sleeve 74 during relative collapse between the upper and lower mast jackets. When the radial depth of the annulus 88 is less than the diameters of the balls 90, the balls interfere with both the lower mast jacket 28 and with the sleeve 84 and absorb energy by cold rolling tracks in each when the upper mast jacket telescopically collapses relative to the lower mast jacket. The length of the sleeve 84 is preferably such that all of the balls 90 are contained within the sleeve throughout the maximum stroke S of the upper mast jacket 30 relative to the lower mast jacket 28. For a full and complete description of non-variable roll deforming energy absorption in a collapsible steering column, reference may be made to the aforesaid U.S. Pat. No. 3,392,599.

The control system 83 includes, in addition to the controller 82 for the variable orifice 80, a first sensor 96 in the passenger compartment 12 for generating an electrical signal indicative of the mass of the driver 20 on the seat 22, a second sensor 98 in the passenger compartment 12 for generating an elecrical signal indicative of the closing speed of the vehicle relative to another vehicle or to a fixed object, and a microprocessor 100 electrically connected to each of the first and second sensors 96 and 98 and to the controller 82. The first sensor 96 may conveniently be a linear variable differential transformer on the seat 22. The second sensor 98 may cocnveniently be an on-board radar unit emitting a signal forward of the vehicle.

Based on the signals from the sensors 96 and 98, the microprocessor 100 continuously or actively computes the kinetic energy of the driver 20 relative to whatever object the vehicle is closing on. The microprocessor has an internal schedule relating the flow area of variable orifice 80 to the energy absorbing capacity of the steering column 24 and continuously derives from that schedule the flow area of the variable orifice 80 which yields a match between the energy absorbing capacity of the steering column and the instantaneously computed kinetic energy of the driver. The microprocessor signals the controller 82 to adjust the variable orifice 80 to that flow area.

A typical operating sequence of the occupant protection system according to this invention is described as follows. When the driver is seated on the seat 22 and is driving the vehicle, the sensors 96 and 98 continuously provide the microprocessor 100 with signals indicative of the driver's instantaneous kinetic energy relative to vehicles or fixed objects representing potential collision situations. The microprocessor 100 signals the controller 82 to open or close the variable orifice 80 to increase or decrease the pressure in the fluid chamber 72 of the bag 70. As pressure increases, the bag 70 squeezes the sleeve 84 around the roll deformers 90 to increase the degree of interference fit of the deformers to increase the energy absorbing capacity of the steering column. As pressure decreases, the roll deformers are squeezed less tightly and the energy absorbing capacity of the steering column decreases.

The flow area of the variable orifice 80 changes continuously as the vehicle is driven even though every closing occurrence on another vehicle or a fixed object does not end in a collision. Rather, the steering column 24 is continuously or actively conditioned at a maximum energy absorbing capacity for the instantaneous conditions being experienced. In the event that a collision actually occurs and an energy absorbing stroke of the steering column is actually initiated, then the kinetic energy of the driver will be fully absorbed just as the upper mast jacket reaches the end of its maximum stroke S. With the steering column having absorbed all of the drivers kinetic energy at just its maximum stroke S, the reaction force experienced by the driver is minimized and there is no abrupt increase in the reaction force as the upper mast jacket encounters the end of its stroke.

The sensor network supplying instantaneous data to the microprocessor 100 can be expanded to even more accurately predict the kinetic energy that the steering column 24 might be required to absorb. For example, the vehicle may advantageously be provided with a lap/shoulder belt arrangement 102 and a pair of continuity and load cell type sensors 104 and 106, respectively, for monitoring the on/off usage condition of the belt and the tension in the belt arrangement when in use. In addition, an ultrasonic sensor 108 in the passenger compartment 12 on the roof 14 and an ultrasonic sensor 110 in the hub of the steering wheel 36 are advantageously provided to monitor the seated height of the occupant 20 and the distance of the occupant from the steering wheel. This information is representative of the kinetic energy the belt system might be expected to absorb before the occupant encounters the steering wheel 36 and initiates energy absorbing collapse of the steering column 24.

The embodiment of the invention in which an exclusive property or privilege is claimed are defined as follows:

1. In a vehicle having a passenger compartment, an actively variable occupant protection system comprising:
    a first member in said passenger compartment stationary relative thereto,
    a second member in said passenger compartment movable relative to said first member through a maximum working stroke from an extended position to a retracted position,
    an energy absorbing means disposed between said first and said second members and operative in response to movement of said second member from said extended position toward said retracted position to develop a force resisting said movement,
    resisting force adjusting means in said energy absorbing means operative to vary the magnitude of said resisting force, and
    control means on said vehicle for said resisting force adjusting means including a plurality of sensors for determining instantaneous operating parameters characteristic of the kinetic energy of an occupant in said passenger compartment and operative to regulate said resisting force adjusting means as a function of said instantaneous operating paramenters so that the energy absorbing capacity of said energy absorbing means through said maximum working stroke between said first and said second members corresponds generally to the kinetic energy of said occupant.

2. The actively variable occupant protection system recited in claim 1 wherein
    said first member is a tubular lower mast jacket of a collapsible steering column of said vehicle, and
    said second member is a tubular upper mast jacket of said collapsible steering column of said vehicle.

3. The actively variable occupant protection system recited in claim 2 wherein
    said energy absorbing means includes a plurality of cold working roll deformers engageable on said lower mast jacket and operative to locally cold work said lower mast jacket during movement of said upper mast jacket relative to said lower mast jacket.

4. In a vehicle having a passenger compartment,
an actively variable occupant protection system comprising
    a collapsible steering column in said passenger compartment including a tubular lower mast jacket stationary relative to said passenger compartment and a tubular upper mast jacket mounted in said passenger compartment for collapse relative to said lower mast jacket through a maximum working stroke from an extended position to a retracted position,
    a cylindrical housing attached to said upper mast jacket and surrounding a portion of said lower mast jacket and including an annular chamber opening radially in toward said lower mast jacket,
    an expandable annular bag in said annular chamber having a first connection to a pump for supplying fluid under pressure to said bag and a second connection to an exhaust for exhausting fluid from said bag,
    a split tubular sleeve in said annular chamber of said housing radially inboard of said annular bag and including a lengthwise gap defined between a pair of circumferential facing edges of said sleeve,
        said split sleeve cooperating with said lower mast jacket in defining an annulus therebetween,
    a plurality of cold working roll deformers disposed in said annulus with an interference fit between said lower mast jacket and said split sleeve so that said lower mast jacket and said split sleeve are cold worked during collapse of said upper mast jacket relative to said lower mast jacket and a force resisting said collapse is generated,
    means defining a variable flow area orifice between said second connection to said annular bag and said exhaust for variably restricting fluid flow from said bag whereby the fluid pressure in said bag is variably controlled,
        the fluid pressure in said bag being operative to radially expand said bag and squeeze said split sleeve to change the magnitude of said interference fit of said roll deformers between split sleeve and said lower mast jacket and thereby magnitude of said resisting force, and
    control means on said vehicle for said variable flow area orifice including a plurality of sensors for determining instantaneous operating parameters characteristic of the kinetic energy of an occupant in said passenger compartment and operative to regulate the size of said variable flow area orifice as a function of said instantaneous operating paramenters whereby the interference fit of said roll deformers between said split sleeve and said lower mast jacket is controlled to provide an energy absorbing capacity through said maximum working stroke between said upper and said lower mast jackets corresponding generally to the kinetic energy of said occupant.

* * * * *